UNITED STATES Patent [19]

United States Patent [19]

Hockham

[11] 4,408,205
[45] Oct. 4, 1983

[54] MULTIPLE BEAM ANTENNA FEED ARRANGEMENT FOR GENERATING AN ARBITRARY NUMBER OF INDEPENDENT STEERABLE NULLS

[75] Inventor: George A. Hockham, Haslemere, England

[73] Assignee: International Telephone and Telegraph Corporation, New York, N.Y.

[21] Appl. No.: 277,149

[22] Filed: Jun. 25, 1981

[51] Int. Cl.³ .................. G01S 13/00; H04B 15/00
[52] U.S. Cl. .................................. 343/16 R; 343/368
[58] Field of Search ............... 343/7.5, 16 R, 100 SA, 343/100 LE, 854; 367/901

[56] References Cited

U.S. PATENT DOCUMENTS

| 3,670,335 | 6/1972 | Hirsch | 343/16 R X |
| 3,964,065 | 6/1976 | Roberts et al. | 343/100 SA X |
| 4,088,970 | 5/1978 | Fassett et al. | 343/854 X |
| 4,316,190 | 2/1982 | Cole | 343/100 LE X |
| 4,338,605 | 7/1982 | Mims | 343/100 SA X |

Primary Examiner—Maynard R. Wilbur
Assistant Examiner—Robert C. Burk
Attorney, Agent, or Firm—W. T. O'Neil; T. E. Kristofferson

[57] ABSTRACT

A directive antenna feed arrangement providing for multiple selectable beam locations and with the ability to provide multiple and independently locatable nulls in specific angular directions in the sidelobe structure of the radiation pattern. An antenna having a plurality of independent antenna elements linearly deployed is coupled to a beam-forming network such as a Rotman lens feed. Main beam directivity is controlled by selection of the Rotman lens ports corresponding to the desired beam direction. Other angles corresponding to the directions of unwanted signals, especially those received on the major sidelobes, are effectively nulled by a phasing network discretely connected to the Rotman lens port at the appropriate angle, the phase control receive signals being mixed with the main beam signal energy. Angle tracking and beam-steering circuits are depicted and described for control of the main beam angle and positioning of the nulls generated.

12 Claims, 4 Drawing Figures

MULTIPLE BEAM ANTENNA FEED ARRANGEMENT FOR GENERATING AN ARBITRARY NUMBER OF INDEPENDENT STEERABLE NULLS

BACKGROUND OF THE INVENTION

1. Field of the Invention

The invention relates to radar systems in general and more specifically to such systems including means for discriminating against unwanted receive signals at angles removed from the main beam.

2. Description of the Prior Art

In any directive antenna configuration, it is inevitable that sidelobes in addition to the main or intended beam are generated. In radar systems an effort is usually made to minimize the response of an antenna system along its sidelobes as compared to the response achieved in a main beam, usually by careful antenna design. When the antenna scans a volume of space and operates in the transmit/receive mode, some energy is inevitably transmitted at unintended angles via the sidelobes. Echoes from targets illuminated by this sidelobe energy can be received through the same sidelobe response. Considering that the inverse fourth power law applies, false angular indications are usually not a problem if the directive antenna has been carefully designed so that sidelobes are not an appreciable fraction of the main beam in amplitude.

In certain types of radar systems a much more difficult problem results from reception of unwanted signals at angles removed from the main radar beam due to sidelobe pick-up from independently radiating sources. That situation can be encountered when a hostile "stand-off" jammer illuminates the receiving antenna of a ground based radar system attempting to track a nearby target. The angle of the interfering source may be such that it coincides with a major sidelobe of the ground system antenna, in which case the interfering signal which is nearly always large compared to echo energy reflected by a target of interest presents the greatest difficulty to the ground radar system. Even if the interfering signal does not coincide with a significant ground antenna sidelobe, a high powered interfering source can frequently inject an undesirably large signal into the ground system.

In the prior art, effort has been expended toward the minimization of antenna sidelobes so that interfering signals at off-angles and other sources of false indications and responses are correspondingly minimized.

Still further, in the prior art, various electronic means have been implemented for minimizing the effect of sidelobes, especially where airborne beacon responses are involved. A so-called GTC (Gain Time Control) operates to reduce the gain of a receiver to replies close to the station, however, a far more satisfactory method of controlling interrogation beam width is the so-called SLS approach. Various SLS approaches are described in Chapter 38 of the text "Radar Handbook" by Merrill I. Skolnik (McGraw-Hill 1970). In general, the so-called SLS (Side Lobe Suppression) techniques rely on the use of a known coded pulse format as from an airborne beacon, for example. A hostile interfering source obviously does not accommodate the ground radar by providing a signal format permitting the ground implementation of most SLS techniques.

The so-called monopulse technique in which the antenna of the ground station provides interferometer operation (i.e., sum and difference patterns) can be employed to steepen the effective ground antenna beam skirts and thereby discriminate against received signal energy at off-angles.

The particular problem represented by the hostile interfering source has not been sufficiently effectively addressed in the prior art. The manner in which the present invention provides greatly improved rejection of off-angle receive signal energy will be understood as this description proceeds.

SUMMARY OF THE INVENTION

The antenna and feed configuration according to the invention includes an array (preferably linear) of independent antenna elements each discretely fed by a corresponding output port of a beam-forming network (preferably a Rotman lens beam former). The Rotman lens then has a plurality of ports each of which corresponds to a particular main beam direction. Accordingly, transmission or reception at that particular angle is effected when the corresponding Rotman lens port is connected to a transmitter or receiver, respectively. By exciting each of these Rotman lens ports in a sequence from one to N for example, the result is a series of beams in space at different angles $\theta$ covering the desired scan sector of the radar. Each of these beams is accompanied by sidelobes which substantially follow the main beam as it is scanned, the sidelobes maintaining substantially uniform angular spacing with respect to the axis of the main beam as the main beam pointing angle is changed.

In a practical instrumentation involving the invention, it would be expected that some form of RF switching matrix would be included for programming the beam-forming network port connections during scanning or controlled beam pointing in accordance with angle tracking of a target of interest.

Accordingly, the beam-forming network port connections corresponding to sidelobe locations as well as main beam locations can be stepped together or can be selected independently. The apparatus of the invention basically places an effective null at each of one or more locations angularly with respect to the main beam, these nulls corresponding to the relatively fixed relationships of sidelobes with respect to a main beam or as a result of independent tracking functions. In the latter situation, the target of interest can be tracked by known angle tracking means and the main beam then kept on target by programming of the beam-forming network port connection corresponding thereto. Independent null tracking can also be accomplished and the angular location of a null independently controlled by independent programming of the beam-forming network port connection corresponding to each such null. When the main beam target and interfering source are independently tracked as aforementioned, the angular spacing between the main beam axis and the null provided in accordance with the invention does not remain constant.

The so-called phasing network provided as a part of the combination of the invention receives signals from the main beam port of the beam-forming network and each null representing port. The phasing network includes a series of couplers and phase shifters whereby received signal energy at the location of a desired null is phase shifted and mixed into the signal line carrying the main beam echo signals in a phase and amplitude which results in the substantial cancellation of signal components in that main beam signal line resulting from sidelobe receptions. In practice, the optimum settings of the phase shifters can be empirically determined by measuring the signal-to-noise ratio of the received signal in the presence of unwanted signals emanating from known directions. More detail in respect to the nature of this phasing network and other aspects of the combination of the invention will be apparent as this description proceeds.

DETAILED DESCRIPTION OF THE DRAWINGS

Figure 1:
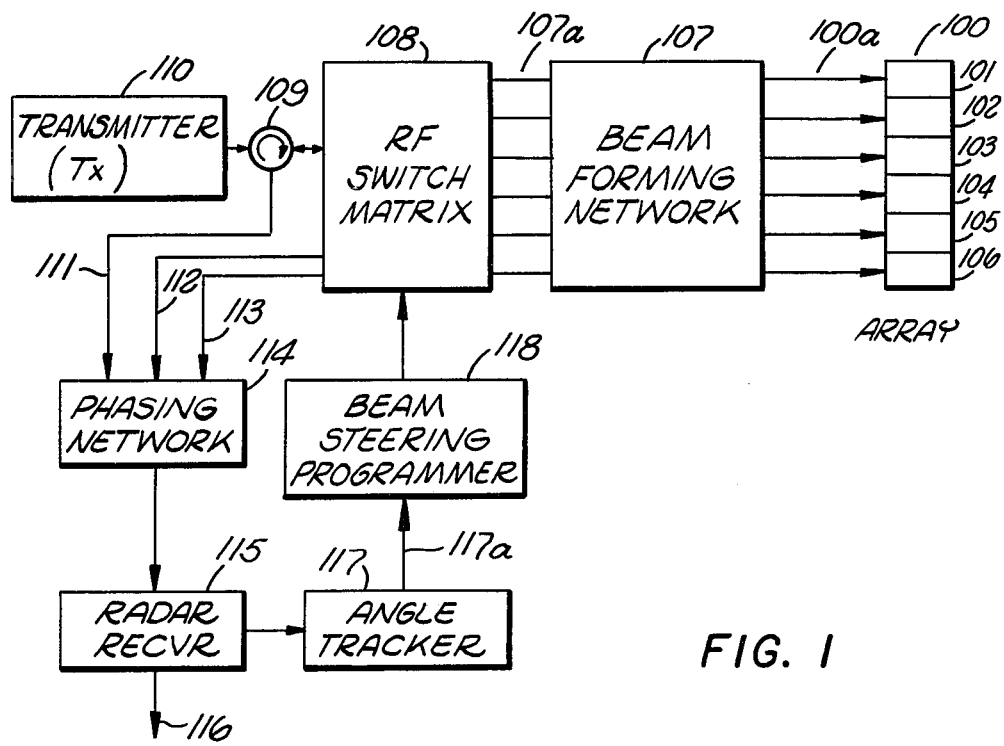
FIG. 1 is a block diagram illustrating the major components of a system according to the invention.

Referring now to FIG. 1, the basic arrangement of a system according to the invention will be explained. For purposes of illustration, it will be assumed that scanning or positioning of the radar main beam by the array 100 is accomplished in azimuth. Thus the array 100 may be a relatively simple horizontal linear array with independent elements 101, 102, 103, 104, 105 and 106. Such an array would not have significant directivity in the azimuth plane unless it were augmented by other structures (a reflector, for example). The invention is of course useful for the generation of a null "slot" (i.e., a null at a predetermined azimuth angle throughout a range of elevation angles), in which case the vertical beam shaping would not be required.

Of course, the array 100 could be comprised of a plurality of columns of linear arrays in which case a pencil beam would be generated for the main beam and each of the null locations. In referring to a pencil beam for a null, the language of transmission is being used, but of course a receiving null is the inverse of what would be a transmit pencil beam.

Whether the array 100 is merely a linear array extending horizontally, such an array with an auxiliary reflector, or a planar array in which each of the elements such as 101, 102, etc. is in fact an independent column or linear array extending vertically, the function of the beam-forming network 107 and the other subsystems and elements of the combination perform substantially the same.

The beam-forming network 107 has a plurality of antenna element interconnecting ports 100A. These ports 100A feed individually phased energy discretely to the array elements on transmission and receive discretely phased information in accordance with beam direction from array 100. Since the beam-forming network 107 is fully reciprocal, it operates to excite the array 100 to generate a beam in a predetermined direction for each first beam port 107A excited for both transmitting and receiving. Beam forming networks per se provide for discrete multiple excitation to form simultaneous plural beams, or conversely to separate receive signal energy into discrete corresponding signals at the first beam-forming network ports 107A in accordance with receiving beam angle.

In a general sense, the beam-forming network 107 could be one of several known matrices which generally accomplish the objective. The so-called Butler matrix is capable of providing such a function, however, a network known in the art as the "Rotman lens" is the preferred beam-forming network for 107. This preference is based on the fact that the Rotman lens is capable of wide-angle scan sectors with fractional-degree beam widths. Moreover, the Rotman lens is known to offer the potential of relatively low sidelobes performance with wide operating and signal bandwidths.

The precise nature of the so-called Rotman lens has been described in the technical literature. These descriptions include the paper "Wide-Angle Microwave Lens for Line Source Applications" by W. Rotman and R. F. Turner, published in the IEEE Transactions on Antennas and Propagation, Vol. AP-11, pp. 623–632 (1963). Other descriptions with additional information on the Rotman lens and its applications include the paper "Lens-Fed Multiple-Beam Arrays" by Donald Archer published in the Microwave Journal, Vol. 18, October 1975, pp. 37–42; and a paper entitled "Microstrip and Triplate Rotman Lenses" by A. Y. Niazi, M. S. Smith and D. E. N. Davis, published by Microwave Exhibitions and Publishers, Sevenoaks, Kent, England, in the "Conference Proceedings—Military Microwaves '80."

Figure 2:
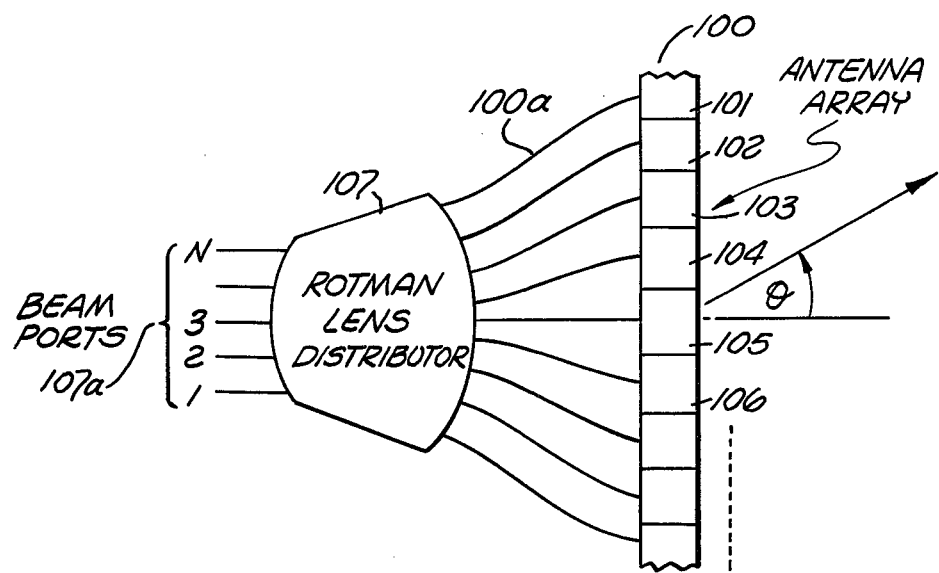
FIG. 2 illustrates the connection of the array elements from a Rotman lens distributor used as the beam-forming network of FIG. 1.

Referring now to FIG. 2, a somewhat more detailed representation of the beam-forming network 107 as a Rotman lens distributor is shown. Other identifications are included, the angle $\theta$ being the discrete but arbitrary location of a beam in azimuth for purposes of further explanation. It will be recalled that azimuth beam-pointing or scan was assumed for purposes of explanation although it will be realized that the invention is not limited to the azimuth case.

Referring again to FIG. 1, it will be seen that an RF switch matrix 108 controlled by a beam-steering programmer 118 is provided. Basically, the RF switch matrix 108 will be understood to be a controllable RF switch, such as a stripline or microstrip and diode switch implemented according to very well understood principles in this art. One example of the use of radio frequency diodes which may be selectively forward or backward biased to modify an RF path is illustrated in U.S. Pat. No. 4,070,639. A further and more general reference regarding the nature of diode RF switches is contained in the text "Radar Handbook" by Merrill I. Skolnik (McGraw-Hill 1970), particularly in Chapter 8, Section 26. That text includes a bibliography for further information on the nature of diode microwave switches and switching circuits suitable for the implementation of switch matrix 108.

Functionally, the RF switch matrix 108 may be summarized as having a main beam connection energized by transmitter 110 through circulator 109 operating as a duplexor for transmitting and through circulator 109 via lead 111 to phasing network 114. Thus, on receiving, this lead 111 would be connected through RF switch matrix 108 to that discrete one of the beam-forming network 107 first inputs at 107A which corresponded to the desired main beam angle for both transmitting and receiving. Thus, the port of the RF switch matrix 108 connecting to circulator 109 is switched through to the appropriate one of the beam-forming network 107 first ports 107A corresponding to a desired main beam angle from the array 100. Appropriate diode switch biasing is readily effected from a beam-steering programmer 118 responding to the output of an angle tracker 117 which tracks a target signal emanating from radar receiver 115 corresponding to a target illuminated by the said main beam. Ignoring the function of phasing network 114 for the moment, it will be noted that the angle tracker 117 is essentially a subsystem of one of the well-known angle tracker techniques. Angle tracking and the circuits and subsystems required have been known from almost the earliest days of radar, the technique being developed originally for anti-aircraft gun direction. The text "Introduction to Radar Systems" by Merrill I. Skolnik (McGraw-Hill, 1962) includes a chapter entitled "Tracking Radar" (Chapter 5), providing a summary of much of the prior art in angle tracking. An extensive bibliography also provides relatively current and historical information on the nature and development of angle tracking. From the well-known prior art, it will be evident that those of skill in this art can readily implement an angle tracker providing a digital or analog output signal to the beam-steering programmer 118. The beam-steering programmer and for that matter the RF switch matrix 108 may be thought of as part of the angle tracking subsystem. The beam-steering programmer 118 provides signals to the matrix 108 for selecting one of the beam-forming networks 107 first ports 107A corresponding to the main beam angular position.

It will be noted that in addition to the main beam signal lead 111, the phasing network 114 receives a pair of signal lines 112 and 113 conveying identified interfering signal angles. Although two such signal leads 112 and 113 are identified on FIG. 1, it will be understood that the number of such signal leads could range from one to a plurality considerably greater than the two illustrated.

For scanning, it would be appropriate to operate the beam-steering programmer 118 in a free-running repetitive mode such that it causes the RF switch matrix 108 to step the main beam successively in relatively small increments through the scan sector of interest. In that case the angle tracker output signal 117A would be ineffective in steering the main beam but, as is accomplished in most angle tracking systems, the signal 117A would re-assert its control once a target is "locked on". Still further, the beam-steering programmer 118 could be constructed to provide a randomized beam-pointing program, since the scanning-beam-pointing function is basically inertialess.

Usually, the null locations in the angular sector of interest would be constrained to follow the main beam with an appropriate offset corresponding to a major sidelobe which it is desired to cancel out. Thus, the beam-steering programmer 118 can be arranged to activate other switch sections in the matrix 108 in addition to that associated with the main beam, the null angle locations as defined by corresponding discrete ones of the beam-forming network first ports 107A being connected discretely to the leads 112 and 113. Thus, when the main beam changes position due to the angle tracker commands, the two nulls aforementioned are slaved to the main beam and move by the same amount in angle as the main beam is moved but maintain their angular spacing from the said main beam.

Digital logic systems are capable of providing the flexibility and function required of 118. For example, a PROM can be programmed to provide a consistent output to the switch matrix 108 to control the appropriate diodes in 108 connecting the signal leads 111, 112 and 113 to the appropriate angle representing ports 107A.

Figure 3:
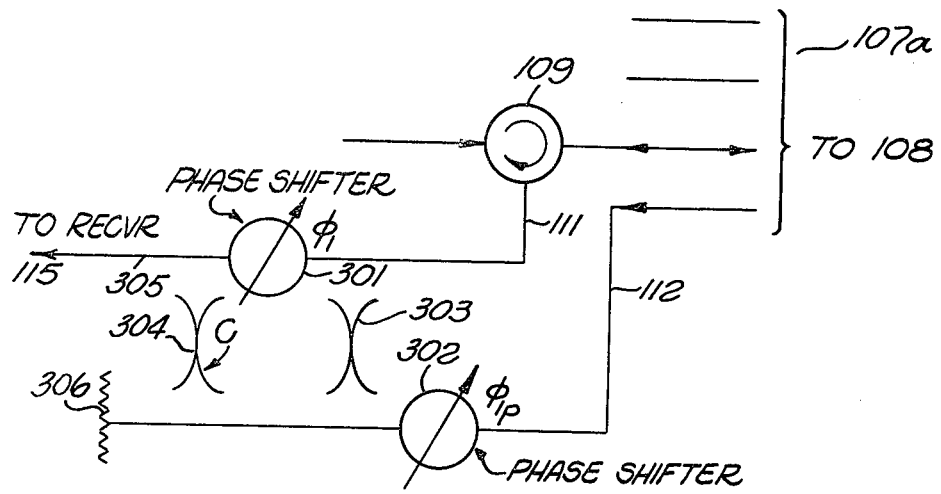
FIG. 3 illustrates the typical arrangement for the phasing network of FIG. 1 for the generation of a single null.
Figure 4:
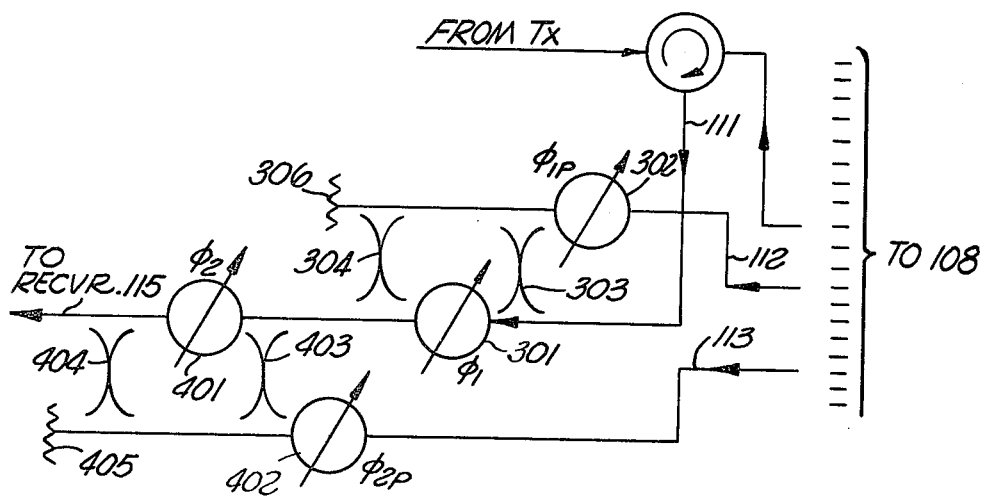
FIG. 4 illustrates the phasing network of FIG. 1 for the generating of two independent nulls.

Referring now to the phasing network 114, instrumentations suitable therefor are represented by FIG. 3 and FIG. 4, the former assuming a single null angle and the latter providing for two null locations as assumed in FIG. 1.

In FIG. 3, circulator 109 and signal leads 111 and 112 will be immediately recognized. Phase shifter 301 ($\emptyset_1$) serves to adjust amplitude at the output 305 lead to radar receiver 115 and the phase shifter 302 ($\emptyset_{1p}$) adjusts the relative phase of the 111 and 112 signal energies so that, in cooperation with the cross couplers 303 and 304, a signal energy on 112 is substantially cancelled at the 305 lead.

If the sidelobe level at the angle of the desired null is assumed to be less than $-30$ dB, then the couplers 303 and 304 should be approximately $-36$ dB couplers. This secondary signal energy necessary to produce the cancellation in each given direction is typically very low and, accordingly, only negligible signal energy is dissipated in the termination 306, that termination being provided for the sake of impedance relations only.

Phase shifters 301 and 302 may be preset manually and empirically to obtain a null at a predetermined angle. To produce a null at another angular location in addition to a first null, the implementation of FIG. 4 likewise provides independent settings for amplitude and phase via phase shifters 401 and 402, respectively. Couplers 403 and 404 provide the same functions in respect to the second null location as was the case with the couplers 303 and 304. If the anticipated level of the second sidelobe to be cancelled was on the order of $-35$ dB, then 403 and 404 should be approximately $-41$ dB couplers. Substantially no interaction is experienced between the settings of phase shifters for one null when those corresponding to another null are adjusted. In both cases, the adjustment is manual and empirical as a function of signal amplitude. That is, the settings of the phase shifter pairs (301 and 302 for the first null and 401 and 402 for the second null) are set to measure the signal-to-noise ratio of the received signal in the presence of unwanted signals in known directions.

The phase shifters may be digital, and in one instance using five-bit phase shifters, two nulls were created in the radiation pattern of a multi-element array antenna.

In FIG. 4, as in FIG. 3, the signal power dissipated in termination 306 is negligible and the same applies to signal energy in termination 405.

It will be noted that once optimum phase shifter settings are empirically determined, and if the angular spacing between nulls and the main beam remains fixed, the phase shifter settings remain undisturbed since the nulls are essentially slaved to the main beam if they are programmed to follow the main beam-pointing angle at the same offset as hereinbefore described.

A person of skill in this art will be quick to appreciate that automatic instrumentation for optimizing the phase shifter settings of FIG. 3 or FIG. 4, or of an even larger phase shift network for accommodating still more null locations, could be implemented.

Still further, it should be understood that the angle tracking functions could be modified to provide null tracking in addition to main beam tracking if it were desired to place one or more nulls on the angle or angles of a source or sources of interference, thus independently directing the null. In that case, the angle between the null and main beam would not remain constant and the null would not necessarily fall on any particular sidelobe of the overall radiation pattern.

Other modifications and variations falling within the spirit and scope of the invention will suggest themselves to those of skill in this art once the invention is understood from the foregoing. Accordingly, it is not intended that the scope of the invention should be considered to be limited by the drawings or this description, these being intended to be typical and illustrative only.

I claim:

1. A directive antenna and feed system for providing a main beam pattern at a first predetermined angle and an arbitrary number of pattern nulls each at a corresponding angle with respect to said main beam predetermined angle, comprising:

a plurality of independent antenna elements deployed in an array;

a reciprocal beam-forming network having a plurality of first ports and a plurality of second ports, each of said second ports being discretely connected to a corresponding one of said independent antenna elements, said network providing excitation of said array so as to form a main beam at a different angle for each of said first ports excited;

duplexing means having transmitter, receiver and antenna ports and connected at its antenna port to a selected one of said beam-forming network first ports corresponding to a predetermined angle of said main beam for conducting transmitted energy to said selected first port; and a phasing network connected to receive incoming signal energy through said duplexing means from said selected beam-forming network first port and directly from at least one other of said first ports on separate terminals of said phasing network, said phasing network having an output terminal for receiver connection and also including means for controllably phasing said incoming signal energy to provide a null at an angle of array reception corresponding to each of said other first ports.

2. A system according to claim 1 in which controllable switching means are provided between said beam-forming network and said duplexing and phasing network, for selection of said beam-forming network first ports corresponding to said main beam and each desired null.

3. A system according to claim 1 in which said beam-forming network is a Rotman lens.

4. A system according to claim 3 in which controllable switching means are provided between said beam-forming network and said duplexing and phasing network, for selection of said beam-forming network first ports corresponding to said main beam and each desired null.

5. A system according to claim 1 in which said phasing network is connected discretely to receive signal energy from another of said beam-forming network first terminals in addition to said first port corresponding to said main beam to provide a null at an angle separated from the angle of said main beam.

6. A system according to claim 1 in which said phasing network is connected discretely to receive signal energy from a plurality of said beam-forming network first ports in addition to said first port corresponding to said main beam to provide a plurality of said nulls at angles separated from the angle of said main beam.

7. A system according to claim 2 or 3 in which said beam-forming network is a Rotman lens.

8. A system according to claim 2 in which said phasing network includes first and second adjustable RF phase shifters and a termination, and in which said first phase shifter is connected from said duplexing means receiver port to said phasing network output terminal, said second phase shifter is connected directly from said other of said beam-forming network first ports to said termination and a pair of low transfer couplers interconnect the signal line between said second phase shifter and said termination discretely to both sides of said first phase shifter.

9. A system according to claim 3 in which said phasing network is connected discretely to two of said beam-forming network first ports for producing two of said nulls at different angles separated from the angle of said main beam.

10. A system according to claim 3 in which said phasing network is defined as having a signal path including a plurality of first adjustable phase shifters in series, connected from said beam-forming network first port corresponding to said main beam, to a plurality of additional adjustable phase shifters each discretely connected between a first port of said beam-forming network corresponding to the angles of each of the desired plural nulls and a termination, one of said first adjustable phase shifters being provided for each of said plural nulls, and a pair of low transfer couplers connected from either side of each of said first adjustable phase shifters to the signal line between one of said additional phase shifters and the corresponding termination.

11. A system according to claim 6 or 8 in which said low transfer couplers are defined as providing a coupling in decibels less than the decibel level of an antenna sidelobe angularly coincident with a corresponding null.

12. A system according to claim 6 or 8 in which controllable switching means are provided between said beam-forming network and said duplexing and phasing network, for selection of said beam-forming network first ports corresponding to said main beam and each desired null.

* * * * *